United States Patent [19]

Luegering

[11] Patent Number: 4,603,813
[45] Date of Patent: Aug. 5, 1986

[54] DOUBLE BACK SPRAY NOZZLE

[75] Inventor: Gregory J. Luegering, Morris, Ill.

[73] Assignee: Insta-Foam Products, Inc., Joliet, Ill.

[21] Appl. No.: 626,332

[22] Filed: Jun. 29, 1984

[51] Int. Cl.$^4$ .............................................. B05B 7/04
[52] U.S. Cl. ................................... 239/399; 239/427; 239/432
[58] Field of Search .................. 239/590.3, 590.5, 427, 239/432, 343, 399; 222/145, 190

[56] References Cited

U.S. PATENT DOCUMENTS

| | | | |
|---|---|---|---|
| 2,012,139 | 8/1935 | Peabody | 239/427 |
| 2,840,185 | 6/1958 | Norgren | 239/590.5 X |
| 3,633,795 | 1/1972 | Brooks | 239/432 X |
| 3,734,406 | 5/1973 | Runstadler | 239/432 X |
| 3,829,013 | 8/1974 | Ratnik | 239/432 X |
| 3,949,970 | 4/1976 | ter Braak | 239/432 X |

*Primary Examiner*—Joseph F. Peters, Jr.
*Assistant Examiner*—Kevin Patrick Weldon
*Attorney, Agent, or Firm*—Angelo J. Bufalino; James T. FitzGibbon

[57] ABSTRACT

An expansion control mixing and dispensing nozzle adapted for attachment to an associated two-component liquid dispensing gun for mixing and dispensing liquid foamable products. The nozzle includes a mixing chamber, a mixing chamber outlet tube and an outlet tube cover arranged in co-axial relation. The outlet tube cover including an outlet slot or passage in its outer end portion; its inner end surrounds a part of the mixing chamber outlet tube so as to define an annular auxiliary chamber therebetween. The mixing chamber has spaced apart inlet ports for receiving individual liquid components and a baffle or the like to impart a swirling action to the components as they expand in the mixing chamber, a pre-discharge chamber lies between the outlet slot and the end of the outlet cover.

7 Claims, 4 Drawing Figures

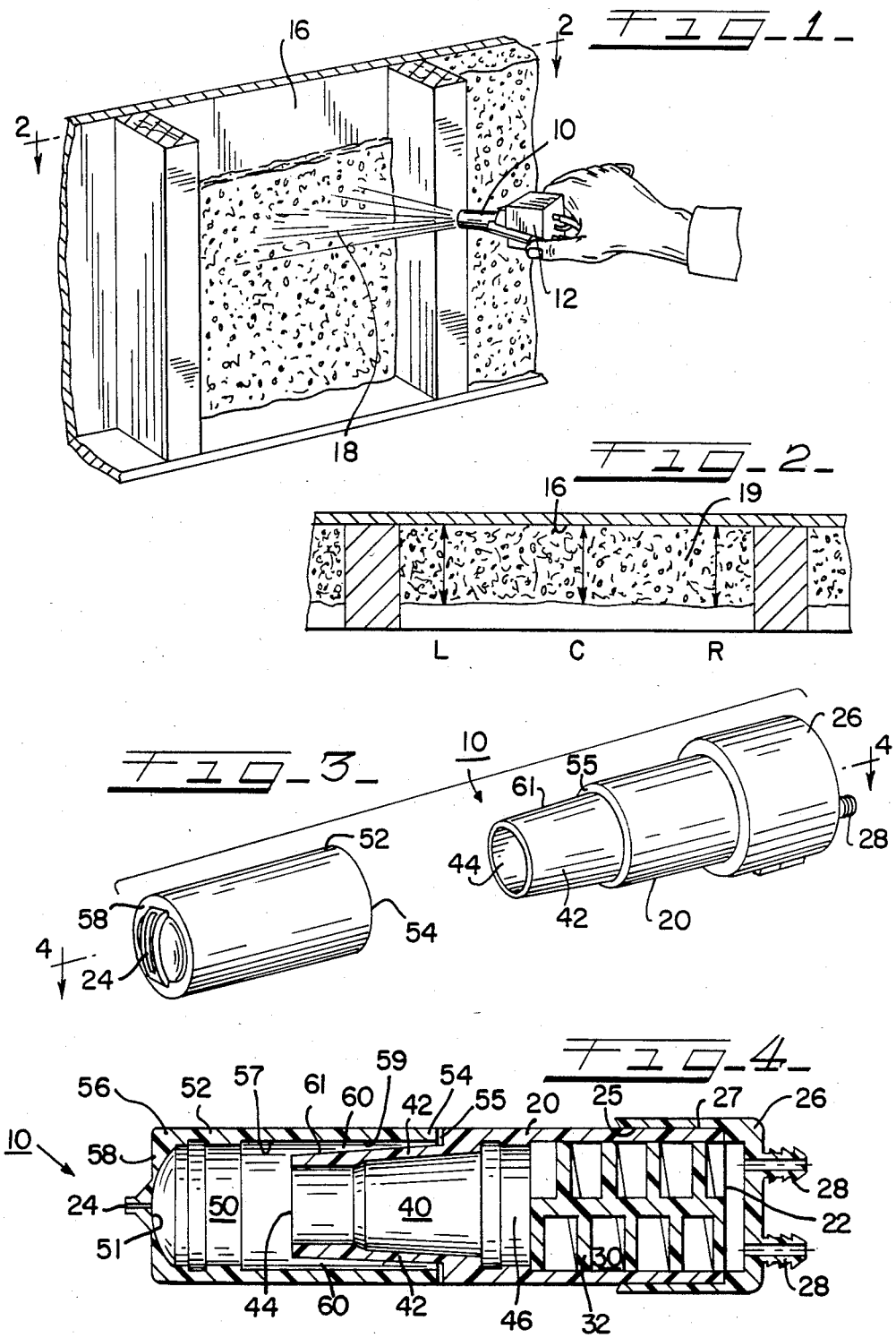

DOUBLE BACK SPRAY NOZZLE

BACKGROUND OF THE INVENTION

This invention relates in general to disposable spray nozzles for mixing and dispensing a multi-component foam or like fluid products, and is more particularly concerned with modifications to the internal chambers of the disposable nozzle in order to produce an even spray pattern of liquid foam product being mixed and dispensed from the spray nozzle.

As is known, a disposable mixing and dispensing nozzle is typically used in connection with a dispensing gun for mixing at least two chemical products, which mixture reacts to create a third, different chemical product. The mixed chemical product is then dispensed through an exit opening in the spray nozzle. An example of the use of the spray nozzle and dispensing gun combination is disclosed in U.S. Pat. No. 3,784,110.

As is also well known from the prior art, disposable spray nozzles are primarily used in connection with the mixing and discharge of chemical components, which because of their chemically reactive nature, must be mixed immediately prior to discharge of the mixed products.

The disposable spray nozzles and dispensing gun are most commonly used in connection with the mixing of two or more foaming products which, when mixed with each other, react to create an adhesive, insulating foam, such as, a urethane foam.

Because of the nature of the urethane reaction, by far the major amount of urethane foam application is done using a two-component system. Whether the components are a resin component and pre-polymer component, as is conventional, or whether these components are differently constituted is immaterial. However, all systems have in common the requirement that the two components which are to be mixed in the spray nozzle be kept separate from each other until just before they enter the spray nozzle for mixing and immediately subsequent discharge.

It is preferable to confine the mixing activity to the interior of the nozzle to insure that the foam undergoes at lease some expansion and thorough mixing, but that the mixed, foamable product does not accumulate on the gun surface or clog the internal passages of the gun. Such accumulation could render the gun partially or completely inoperative, or at the very least require a thorough cleaning prior to the next use of the gun. The cleanup problems arise from the two component nature of the foam whose contents are (and tend to remain) fluid as long as they are not exposed to air or to each other, but which immediately thereafter react to become largely insoluble as well as of an adhesive sticky consistency.

As a result, disposable spray nozzles of the type disclosed herein and in U.S. Pat. No. 3,784,110, were adapted to be inserted into the dispensing gun to establish a fluid-tight relationship between a part of the gun and the nozzle to insure that the mixing of the chemical products occurred exclusively within the nozzle. Consequently, by arranging for the entire mixing operation to be conducted within the spray nozzle, and for the nozzle to be positively aligned or indexed and registered with the dispensing gun in fluid-tight relationship, spraying is easy, but when spraying is completed, the inexpensive nozzle assembly may be ejected or thrown away. Therefore, there are no hidden or inaccessible passages requiring cleanup by the operator. The gun may be cleaned from its exterior surfaces merely by dipping or spraying with water or solvent, but inasmuch as there are no interior passages for mixed fluids, or mixing chambers on or in the gun body, there are no chemical reaction products which would clog, dirty, or render ineffective any parts or elements of the dispensing gun.

As is known, the nozzle may be used for an extended period of time as long as the use is relatively continuous. However, if the operation is to be stopped for a number of minutes or hours, for example, the reaction clogs the nozzle, and the used nozzle assembly is merely removed and discarded, and replaced with a new one any time before the new operation is commenced.

During the use and operation of the spray nozzle and dispensing gun, the two chemical components enter the mixing chamber located at one end of the spray nozzle and, after mixing, the mixed foam product is discharged through an orifice opening at the other end of the spray nozzle.

The prior art spray nozzle as typically shown in U.S. Pat. No. 3,784,110, utilizes a single internal chamber in which the chemicals are mixed and such that the spray pattern of the mixed product is formed within that same chamber for ultimate discharge. In using nozzles of this type, the user is not always able to accurately control the spray pattern of mixed liquid foam being discharged from the dispensing gun and spray nozzle. Very often the liquid foam is discharged in an uneven pattern, thereby resulting in an uneven distribution of liquid foam product on a sprayed surface. A significant waste of the foam product, or compromise of quality resulted. Due to the high cost of the foam product, uneven discharge and distribution and the resulting waste, became problems for which no ready solution was apparent.

With the increased demand for insulated structures, particularly homes, office buildings, warehouses and refrigerated vehicles, the application of urethane and like insulating foams to building structures has become a major industry. Thus, the problem of waste of foam product has assumed great importance in view of the large quantity of such foam products currently being utilized in the building industry.

It would be very desirable to have a spray nozzle, which, because of its own configuration, will ensure that an even pattern of liquid foam is emitted from the spray nozzle during use, to eliminate excessive waste of liquid foam product, and increase the quality of foam application during the use of the dispensing gun and spray nozzle.

SUMMARY OF THE INVENTION

It is therefore, a general object of the present invention to provide a disposable spray nozzle having improved performance.

A more specific object of the present invention is to provide a nozzle which improves the spray pattern of liquid foam being discharged from the nozzle.

Another object of the invention is to provide a disposable spray nozzle that has an internal configuration which will allow the discharge of an even spray pattern from the spray nozzle.

Still another object of the invention is to permit the liquid foam to be discharged in a controlled fan-shaped pattern.

It is another object of the invention to eliminate the waste of liquid foam product during the use of the spray nozzle.

A further object of the present invention is to obtain an evenly distributed pattern of a fluent foamable product on the sprayed surface.

Another object of the invention is to provide a spray nozzle for a fluent, foamable material which nozzle includes a principal mixing chamber, which includes an inner chamber with inlet and outlet ends and baffles arranged to direct the fluid flow through a spiral pattern of measurable length toward the inner chamber, an expansion chamber surrounding and spaced from the inner chamber outlet, and having a discharge slot at its outer end, with an annular tapered expansion chamber lying there between.

To this end, the invention disclosed and claimed herein comprises a disposable mixing and dispensing spray nozzle for use in a dispensing gun for a mixing liquid foam or other like products, wherein the internal construction of the spray nozzle is constructed and arranged so as to modify the flow of the liquid foam being mixed therein such that an even fan-shaped pattern of liquid foam is discharged from the spray nozzle to provide a uniform distribuation of the liquid foam on the sprayed surface.

The manner in which the aforesaid objects and advantages of the invention are achieved in practice will become more clearly apparent when reference is made to the accompanying detailed descripton of the preferred embodiment of the invention which is set forth herein by way of example, and shown in the accompanying drawings, wherein like reference numerals indicate corresponding parts throughout.

BRIEF DESCRIPTION OF THE DRAWINGS

FIG. 1 is perspective view of the spray nozzle of the present invention, showing the nozzle in operation applying foam to a portion of a wall surface to be insulated.

FIG. 2 is a sectional view of the wall surface shown in FIG. 1 taken along lines 2—2 thereof, and showing the insulation in place uniformly on the wall.

FIG. 3 is an exploded perspective view, on an enlarged scale of the spray nozzle of the present invention.

FIG. 4 is a further enlarged horizontal sectional view of the spray nozzle of FIG. 3, taken along lines 4—4 thereof and showing the nozzle in an assembled relation.

DESCRIPTION OF THE PREFERRED EMBODIMENT

Referring now to the drawings in greater detail, there is shown a disposable mixing and dispensing spray nozzle generally designated 10, which is adapted to be used in connection with a dispensing gun 12. The combination of the nozzle 10 and the gun 12 is utilized to spray, for example, a wall surface 16 with fluent foamable material and is the reaction product of an isocyanate component and a resin compound, as shown in FIGS. 1 and 2.

The nozzle 10, when assembled is generally cyclindrical in shape, having axially extending outer wall 20, an inlet opening 22 located at the end thereof and an orifice or slit opening 24 located at the other or outlet end of the cylindrical nozzle 10. The nozzle 10 further includes a cap 26 closing off the inlet opening 22. The cap 26 has a pair of inlet ports 28. The cap 26 is adapted to be affixed to the end of the nozzle 10 to effectively close the inlet opening 22. The interior walls 25 of the cap 26 surround, lie along and contact the outer surface 27 of the marginal portions of the outer wall 20 adjacent to the inlet opening end 22 of the nozzle 10. During manufacture of the nozzle 10, the interior walls 25 of the cap 26 are sealed to be outside surface 27 of the outer wall 20 to ensure that the cap will not become dislodged from the nozzle body during use of the spray nozzle 10.

The inlet ports 28 on the cap 26 are adapted to be indexed into registration with counterpart openings (not shown) in the dispensing gun 12 to establish a fluid-tight relationship between outlet ports (not shown) of the gun 12 and the nozzle 10. The fluid-tight like relationship between the nozzle 10 and the gun 12 will ensure that the mixing of fluids entering the nozzle 10 through the inlet ports 28 will take place exclusively within the nozzle's interior.

The nozzle 10 has three internal chambers or passages generally designated 30, 40 and 50. The mixing chamber 30 is positioned adjacent to the inlet opening 22 of the nozzle 10 and is partially contained within the cap 26, such that the inlet ports 28 are in direct fluid communication with the mixing chamber 30. A helically configured mixing guide or baffle 32 is positioned within the mixing chamber 30 for imparting a controlled helical swirling or mixing action to the liquid components entering the chamber 30 from the inlet ports 28, and to provide an increased residence time within the mixing chamber 30. The guide 32 helps blend the two entering liquids into fully mixed fluid prior to passage from the chamber 30 into the intermediate passage 40.

The intermediate passage 40 is defined by a radially inwardly tapering conical wall 42 which extends from the outlet of the mixing chamber 30 toward the discharge slit 24, and is adapted to receive the mixed liquid flowing out of the mixing chamber 30. The conical passage 42 has an outlet opening 44 which is of a reduced dimension from the inlet opening 46. The conical passage 42 is constructed so as to constrict the flow of mixed liquid emanating from the mixing chamber 30 so as to impart a back pressure thereto.

In use, the mixed liquid flows through the outlet opening 44 of the intermediate passage 40 to the pre-discharge or end chamber 50. The end chamber 50 includes an elongated axially extending side wall 52 having one of its ends 54 meeting a shoulder 55 on the outer nozzle wall 20 and the other of its ends 56 closed off by an apertured end wall 58.

The end wall 58 has diametrically extending side walls defining the slit 24 which, in use, imparts a fan-shaped form to the fluent products being discharged in a pre-determined direction. The pre-discharge chamber 50 is of elongated diameter in relation to the outlet opening of the passage 40.

An inner surface 57 of the sidewall 52 includes a margin 59 of substantial width which, in combination with the shoulder 55 and the outer tapered surface 61 of the conical intermediate chamber 40 provides a novel contoured expansion chamber 60 to which reference is made elsewhere herein.

The pre-discharge chamber 50 has an arcuate or spherical section surface 51 located adjacent to the slit 24 at the pre-discharge chamber end 56. During use of the spray nozzle 10, the surface 51 assists in the development of the spray pattern of liquid being discharged from the nozzle 10. The mixed fluids entering the chamber 50 initially contact the surface 51 and because of its spherical contour, are deflected or refluxed back in a direction opposite the principal flow of fluid entering the pre-discharge chamber 50. This reverse flow of fluid is believed to affect the velocity and flow patterns within the fluid flowing into and through this region such that the spray pattern of the fluid being discharged is significantly modified.

As the mixed fluids pass into and through the pre-discharge chamber 50, the spiral flow of fluid is believed transformed so as to create a fan-shaped form of fluid product 18 for discharge through the slit 24. While it is not known why such transformation takes place, and the invention is not intended to be limited to any particular theory or method of operation, it is believed that the combination of the pre-discharge chamber 50 positioned adjacent to the intermediate passage 40 and having a diameter greater than the diameter of the intermediate passage outlet 44, together with the contoured expansion chamber 60 surrounding a portion of the intermediate passage 40 cause a reverse flow of fluid from the arcuate surface 51 back toward the intermediate and expansion chambers 40 and 60, respectively, causing flow patterns effective to modify the spiral flow of fluid into the desired fan-shaped fluid discharge pattern.

During development and testing of the nozzle 10, the shape and dimension of the tapered cone 42, the pre-discharge chamber 50 and the expansion chamber 60 were varied in order to obtain optimum performance of the nozzle 10 whereby the fluent product was discharged in an even fan-shaped form. In the preferred form, as shown by FIG. 4, the nozzle 10 includes a cone 42 which has an axial dimension which is greater than the axial dimension of the pre-discharge chamber 50; the pre-discharge chamber 50 has a diameter greater than the diameter of the outlet opening 44 of the intermediate passage 40; and the expansion chamber 60 axially surrounding the tapered cone 42 is open to and in direct communication with the pre-discharge chamber 50. Modifying the dimensions of the slit 24 within relatively wide limits did affect the uniformity and other desirable qualities of spray pattern being discharged therethrough.

As shown in FIGS. 2 and 4, using the preferred form of the nozzle 10 makes possible uniform thickness application of the foaming material to the foam surface to be insulated. The width of the insulating foam material 19 applied to the wall surface 16 is of substantially uniform thickness in the center C of the wall surface and at the right R and left L portions of the wall surface 16. This uniform distribution on the wall surface 16 is a highly desirable result not believed attainable in the prior art with discharges of such great pattern width using low cost equipment.

While the invention has been described with reference to a preferred embodiment, it will be understood by those skilled in the art that various changes may be made and equivalents may be substituted for the elements thereof without departing from the spirit of the invention or the scope of the appended claims. In addition, modifications to the specifics will occur to those skilled in the art. Therefore, it is intended that the invention not be limited to the particular embodiment disclosed as the best mode contemplated for carrying out this invention, but that the invention will include all embodiments falling within the scope of the appended claims.

I claim:

1. An expansion control mixing and dispensing nozzle adapted for attachment to an associated two-component liquid dispensing gun for mixing and dispensing liquid foamable products, said nozzle having a generally cylindrical exterior surface and comprising, in combination, a mixing chamber, a mixing chamber outlet tube and an outlet tube cover and nozzle discharge element, said mixing chamber having an axially extending, continuous side wall having inner surface portions defining at least a part of said mixing chamber, an end wall closing off the axially inner end of said mixing chamber and including a pair of spaced apart inlet ports for receiving the individual liquid components of said mixture, means disposed within said inner surfaces of said mixing chamber sidewalls for imparting a swirling action to expanding foamable materials passing through said mixing chamber, said mixing chamber outlet tube having axially inner and outer annular edge surfaces defining respectively a tube inlet communicating with the interior of said mixing chamber and tube outlet having a reduced cross-sectional area in relation to said tube inlet, said tube further including a radially outwardly continuous tube surface extending toward and meeting said axially outer edge surface of said tube outlet, said outlet tube cover and nozzle discharge element including an axially inner margin terminating in an end portion affixed to an outer part of said mixing chamber side wall, an axially outer margin having its edge portion joined to an inner end face cover surface closing off said tube cover and having spaced apart, longitudinally extending side walls defining a product discharge slot, and generally cylindrical, axially extending radially inwardly directed sidewall portions extending between said axially inner and outer ends of said tube cover and discharge element to define a pre-discharge chamber adjacent the axially outer end of said cover and discharge element, and an annular auxilliary chamber lying between said axially inner margin of said inwardly directed tube cover sidewalls and said radially outwardly directed tube surface of said outlet tube.

2. An expansion control mixing and dispensing nozzle as defined in claim 1 wherein said means for imparting a swirling action to said expanding foamable materials comprises a baffle unit having helical vanes thereon, said vanes being arranged about a center element extending generally axially of said mixing chamber.

3. An expansion control mixing and dispensing nozzle as defined in claim 1 which further includes a cap member disposed at the axially inner end of said nozzle, said cap member having a generally cylindrical exterior surface of a diameter slightly greater than said generally cylindrical exterior surface of said nozzle, thereby providing a shoulder portion to assist in positioning said nozzle with said associated dispensing gun.

4. An expansion control mixing and dispensing nozzle as defined in claim 1 wherein the volume of said predischarge chamber is substantially equal to the volume of said mixing chamber outlet tube.

5. An expansion control mixing and dispensing nozzle as defeined in claim 1 wherein said mixing chamber outlet tube has an axial length which is greater than the axial length of said predischarge chamber.

6. An expansion control mixing and dispensing nozzle as defined in claim 1 which further includes a pair of nipples extending axially outwardly from said nozzle, said nipples having interior passages communicating with said spaced apart inlet ports in said mixing chamber.

7. An expansion control mixing and dispensing nozzle as defined in claim 1 wherein said nozzle is constructed from a thermoplastic material.

* * * * *